E. J. HARDY.
UNIVERSAL JOINT.
APPLICATION FILED APR. 24, 1918.
1,296,796. Patented Mar. 11, 1919.
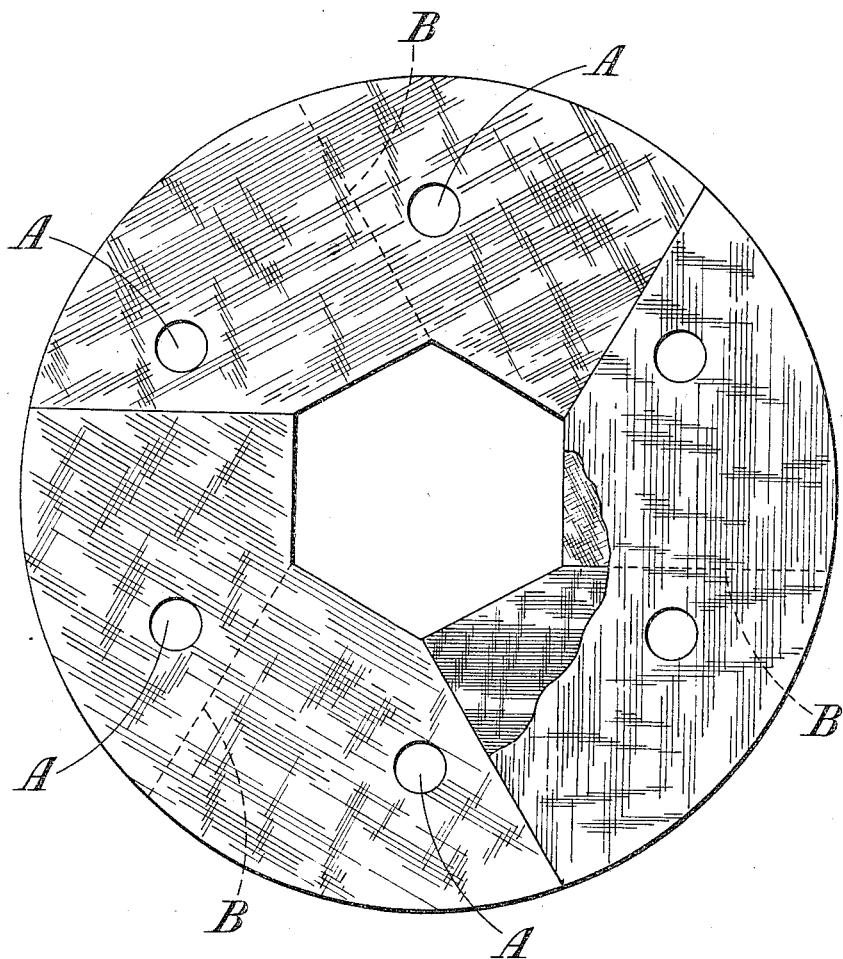
Inventor:
Edward John Hardy,
by Spear, Middleton, Donaldson & Spear
Attys.

UNITED STATES PATENT OFFICE.

EDWARD JOHN HARDY, OF COVENTRY, ENGLAND.

UNIVERSAL JOINT.

1,296,796.   Specification of Letters Patent.   Patented Mar. 11, 1919.

Application filed April 24, 1918. Serial No. 230,569.

*To all whom it may concern:*

Be it known that I, EDWARD JOHN HARDY, a subject of the King of England, residing in Coventry, Warwickshire, England, have invented certain new and useful Improvements in Universal Joints, of which the following is a specification.

This invention relates to improvements in flexible universal joints of the type in which a flexible coupling disk, formed of layers of textile fabric, is used to connect the jaws or studs of driving and driven elements. The layers are stuck together by rubber or the like, and the jaws or studs penetrate into holes in the coupling disk which thus transmits the drive. In this type of coupling disk it has been proposed to cut each layer of textile fabric in similarly shaped segments so that each segment transmits the driving stress from a driving stud to its adjacent driven stud, the threads being disposed parallel to a line joining the said studs, and the said segments being assembled so that the joints of segments in adjacent layers are staggered. According to this invention the segments are assembled so that the portions of the disk transmitting the driving stress include a joint between the segments in alternate layers. Such a disk will be of equal strength between any pair of stud holes, and thus it may be placed in position without regard to the direction of drive.

The accompanying drawing illustrates a disk formed of layers having three segments each with a pair of holes A. There are six studs in all—three driving and three driven, alternately placed. Dotted lines B indicate the joints of the segments in the layers immediately below and above the layer shown in full lines. It will be seen that all the segments are similar in shape, and that the joints in alternate layers are staggered 60°. Each segment is cut from textile fabric so that the threads are parallel to a line joining the two holes in the segment.

What I claim as my invention and desire to secure by Letters Patent is:—

A universal joint comprising a series of layers of textile fabric united with each other, and having openings to receive driving and driven studs, each layer of textile fabric being formed in segments, each segment being of a size to join two adjacent studs, and having its threads running substantially parallel to a line joining the said studs, the joints between the segments in adjacent layers being located between different pairs of studs, for the purpose described.

In testimony whereof I have signed my name to this specification in the presence of two subscribing witnesses.

EDWARD JOHN HARDY.

Witnesses:
ALBERT BROWN,
SIDNEY D. JOHNSON.